United States Patent
Cusmariu

(10) Patent No.: US 7,895,659 B1
(45) Date of Patent: Feb. 22, 2011

(54) METHOD OF ASSESSING SECURITY OF AN INFORMATION ACCESS SYSTEM

(75) Inventor: Adolf Cusmariu, Eldersburg, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 538 days.

(21) Appl. No.: 12/152,118

(22) Filed: Apr. 18, 2008

(51) Int. Cl.
*G06F 11/00* (2006.01)
(52) U.S. Cl. ...................................... 726/25
(58) Field of Classification Search ............ 726/2, 726/22–25; 713/151, 164, 188
See application file for complete search history.

(56) References Cited

U.S. PATENT DOCUMENTS

| | | | |
|---|---|---|---|
| 7,290,282 B1 * | 10/2007 | Renert et al. ................. 726/24 |
| 7,328,454 B2 | 2/2008 | Strickland et al. |
| 7,805,762 B2 * | 9/2010 | Rowland ...................... 726/25 |
| 2006/0129810 A1 | 6/2006 | Jeong et al. |
| 2006/0204049 A1 * | 9/2006 | Schneider et al. ........... 382/115 |
| 2008/0168534 A1 * | 7/2008 | Takamizawa et al. .......... 726/2 |
| 2008/0172729 A1 * | 7/2008 | Takamizawa et al. .......... 726/7 |
| 2008/0222722 A1 * | 9/2008 | Navratil et al. ................ 726/21 |

* cited by examiner

*Primary Examiner*—Beemnet W Dada
(74) *Attorney, Agent, or Firm*—Robert D. Morelli

(57) ABSTRACT

A method of assessing security of an information access system by selecting at least one verification mechanism, estimating an error tradeoff plot showing false acceptance rate versus false rejection rate for each verification mechanism, selecting a corresponding false acceptance rate and false rejection rate pair from each error plot, combining the false acceptance rates to determine intrusion protection, combining the false rejection rates to determine denial protection, and combining intrusion protection and denial protection as the assessment of the information access system.

12 Claims, 1 Drawing Sheet

METHOD OF ASSESSING SECURITY OF AN INFORMATION ACCESS SYSTEM

FIELD OF INVENTION

The present invention relates, in general, to electronic computers and digital processing systems support and, in particular, to security levels.

BACKGROUND OF THE INVENTION

Information access systems are not completely secure. They are susceptible to denial attacks and intrusion attacks. Being able to assess the security of an information access system is important when deciding which one to use.

Prior art methods of assessing security of information access systems include a method of receiving security information, categorizing it, scoring it, and determining the level of security. The result only produces a low, medium, or high assessment. Another method scans remote systems and surveys them for aspects that may have security vulnerabilities. The result is only a table for each remote system listing those aspects.

Assigning a real and objective measure of the security of an information access system is not addressed in the prior art. In the prior art, the resulting security assessment is subjectively qualified as low, medium or high. The prior art does not discuss the trade-offs of favoring one aspect the security over another. Other prior art simply scans remote computers and returns vulnerability aspects of the system. The result is just a table with the configuration of the system. Again, it produces no objective security measure. Therefore, there is a need for a method to objectively assess the security of an information access system. The present invention does just that.

U.S. Pat. Appl. No. 20060129810 A1, entitled "METHOD AND APPARATUS FOR EVALUATING SECURITY OF SUBSCRIBER NETWORK," discloses a method of receiving information regarding a subscriber network. That information is then classified and given scores. Those scores result in the subscriber network being given security vulnerability levels of low, medium or high. U.S. Pat. Appl. No. 20060129810 A1 is hereby incorporated by reference into the specification of the present invention.

U.S. Pat. No. 7,328,454, entitled "SYSTEMS AND METHOD FOR ASSESSING COMPUTER SECURITY," discloses a method for identifying the aspects of a system vulnerable to an attack. A system scans remote systems and checks for aspects known to be vulnerable to an attack. The result is simply a list of possible components where each remote system could be attacked. U.S. Pat. No. 7,328,454 is hereby incorporated by reference into the specification of the present invention.

SUMMARY OF THE INVENTION

It is an object of the present invention to assess the security of an information access system.

The present invention is a method of assessing security of an information access system.

The first step of the method is selecting at least one user-definable verification mechanism.

The second step of the method is estimating an error tradeoff plot for each user-definable verification mechanism showing false acceptance rate versus false rejection rate.

The third step of the method is selecting a false acceptance rate from each error tradeoff plot.

The fourth step of the method is determining a false rejection rate that corresponds to each of the selected false acceptance rates.

The fifth step of the method is combining the false acceptance rates to determine intrusion protection.

The sixth step of the method is combining the false rejection rates to determine denial protection.

The seventh step of the method is combining the intrusion protection and denial protection as the assessment of the information access system.

DETAILED DESCRIPTION

Figure 1:
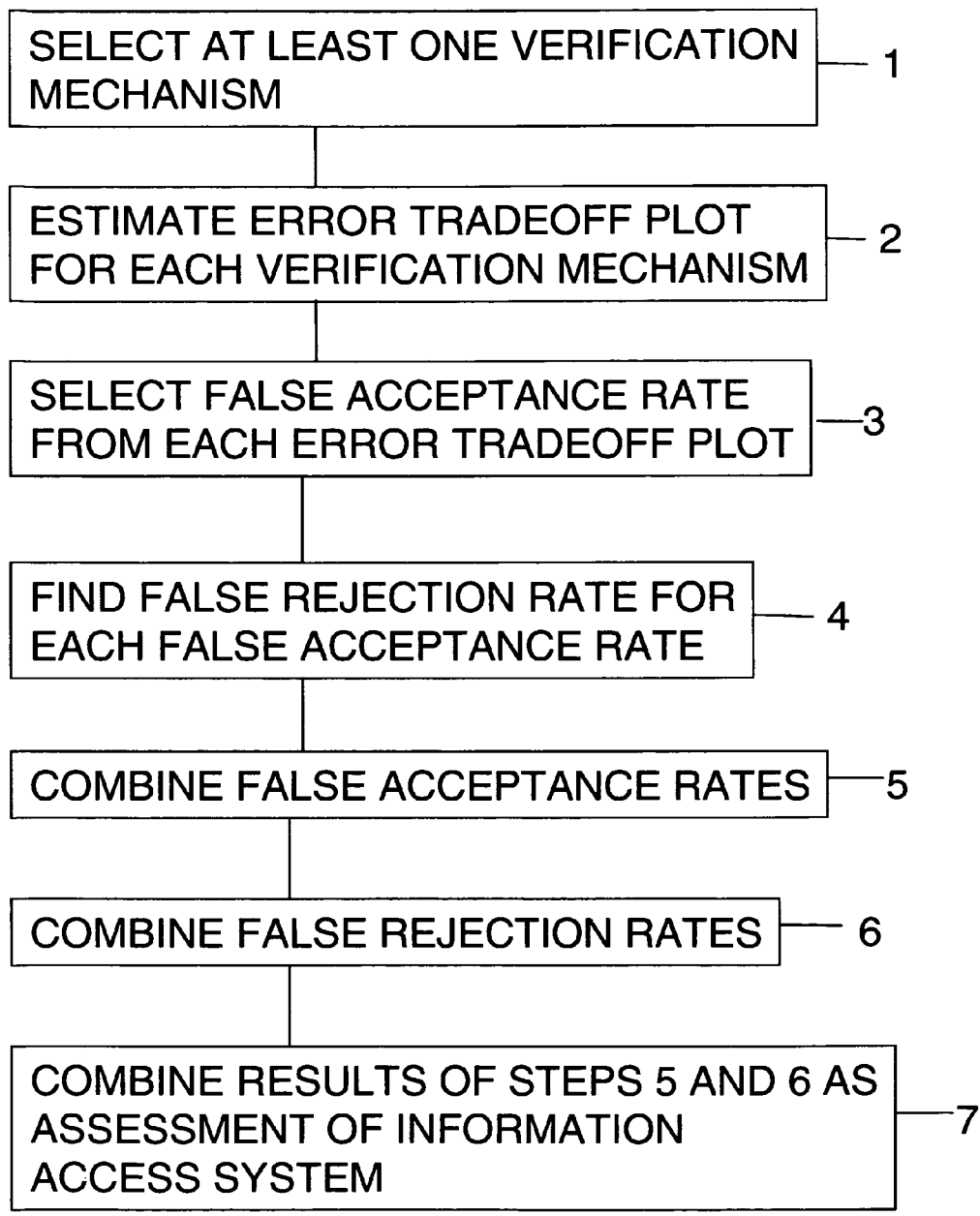
FIG. 1 is a flowchart of the steps of the present invention.

The present invention is a method of assessing security of an information access system.

FIG. 1 is a flow chart of the present invention.

The first step 1 of the method is selecting at least one user-definable verification mechanism. In the preferred embodiment, the verification mechanisms are selected from username, password, personal identification number, and at least one biometric, e.g., fingerprint, retinal scan, voice, face, etc.

The second step 2 of the method is estimating an error tradeoff plot for each verification mechanism. Each error tradeoff plot plots the false acceptance rate versus the false rejection rate. In the preferred embodiment, each error tradeoff plot is derived empirically.

The third step 3 of the method is selecting a false acceptance rate from each error tradeoff plot.

The fourth step 4 of the method is determining a corresponding false rejection rate for each selected false acceptance rate.

The fifth step 5 of the method is combining the determined false acceptance rates to find intrusion protection (IP). In the preferred embodiment, the false acceptance rates are combined by calculating $$IP = -10 \sum_{i=1}^{n} (\log_{10}(\text{false acceptance rate}_i)).$$

The sixth step 6 of the method is combining the false rejection rates to determine denial protection (DP). In the preferred embodiment, the false rejection rates are combined by calculating $$DP = -10\log_{10}\left(\sum_{i=1}^{n} (\text{false rejection rate}_i)\right).$$

The seventh step 7 of the method is combining the IP and DP as the assessment of the information access system. In the preferred embodiment, the IP and DP are combined by calculating $\sqrt{(IP)^2 + (DP)^2}$ and $$\frac{180°}{\pi} \arctan\left(\frac{DP}{IP}\right).$$

The first result determines the security magnitude so that the larger the result, the better the security of the information access system. The second result determines the security direction. At 45°, the denial protection is balanced with the intrusion protection. Below 45°, intrusion protection is favored, and above 45°, denial protection is favored.

What is claimed is:

1. A method of assessing security of an information access system, comprising the steps of:
   a) selecting on a computing device at least one user-definable verification mechanism;
   b) estimating on a computing device an error tradeoff plot for each of said user-definable verification mechanisms, wherein said error tradeoff plot plots false acceptance rate versus false rejection rate;
   c) selecting on a computing device a false acceptance rate from each error tradeoff plot;
   d) determining on a computing device a false rejection rate corresponding to each of said selected false acceptance rate;
   e) combining on a computing device said false acceptance rates;
   f) combining on a computing device said false rejection rates; and
   g) combining on a computing device the results of step (e) and step (f) as the assessment of the information access system.

2. The method of claim 1, wherein the step of selecting on a computing device at least one user-definable verification mechanisms is comprised of selecting on a computing device at least one user-definable verification mechanism from the group of verification mechanisms consisting of username, password, personal identification number, and at least one biometric.

3. The method of claim 1, wherein the step of estimating on a computing device an error tradeoff plot is comprised of empirically deriving on a computing device an error tradeoff plot.

4. The method of claim 1, wherein the step of combining on a computing device false acceptance rates is comprised of calculating on a computing device $$IP = -10 \sum_{i=1}^{n} (\log_{10}(\text{false acceptance rate}_i)).$$

5. The method of claim 1, wherein the step of combining computing device false rejection rates is comprised of calculating on a computing device $$DP = -10 \log_{10} \left( \sum_{i=1}^{n} (\text{false rejection rate}_i) \right).$$

6. The method of claim 1, wherein the step of combining on a computing device the results of step (e) and step (f) is comprised of calculating on a computing device a security magnitude as $\sqrt{(IP)^2+(DP)^2}$.

7. The method of claim 1, wherein the step of combining on a computing device the results of step (e) and step (f) is comprised of calculating on a computing device a security direction as $$\frac{180°}{\pi} \arctan\left(\frac{DP}{IP}\right).$$

8. The method of claim 2, wherein the step of estimating on a computing device an error tradeoff plot is comprised of empirically deriving on a computing device an error tradeoff plot.

9. The method of claim 8, wherein the step of combining on a computing device false acceptance rates is comprised of calculating on a computing device $$IP = -10 \sum_{i=1}^{n} (\log_{10}(\text{false acceptance rate}_i)).$$

10. The method of claim 9, wherein the step of combining on a computing device false rejection rates is comprised of calculating on a computing device $$DP = -10 \log_{10} \left( \sum_{i=1}^{n} (\text{false rejection rate}_i) \right).$$

11. The method of claim 10, wherein the step of combining on a computing device the results of step (e) and step (f) is comprised of calculating on a computing device the security magnitude as $\sqrt{(IP)^2+(DP)^2}$.

12. The method of claim 11, wherein the step of combining on a computing device the results of step (e) and step (f) is comprised of calculating on a computing device the security direction as $$\frac{180°}{\pi} \arctan\left(\frac{DP}{IP}\right).$$

* * * * *